United States Patent Office 3,123,092
Patented Mar. 3, 1964

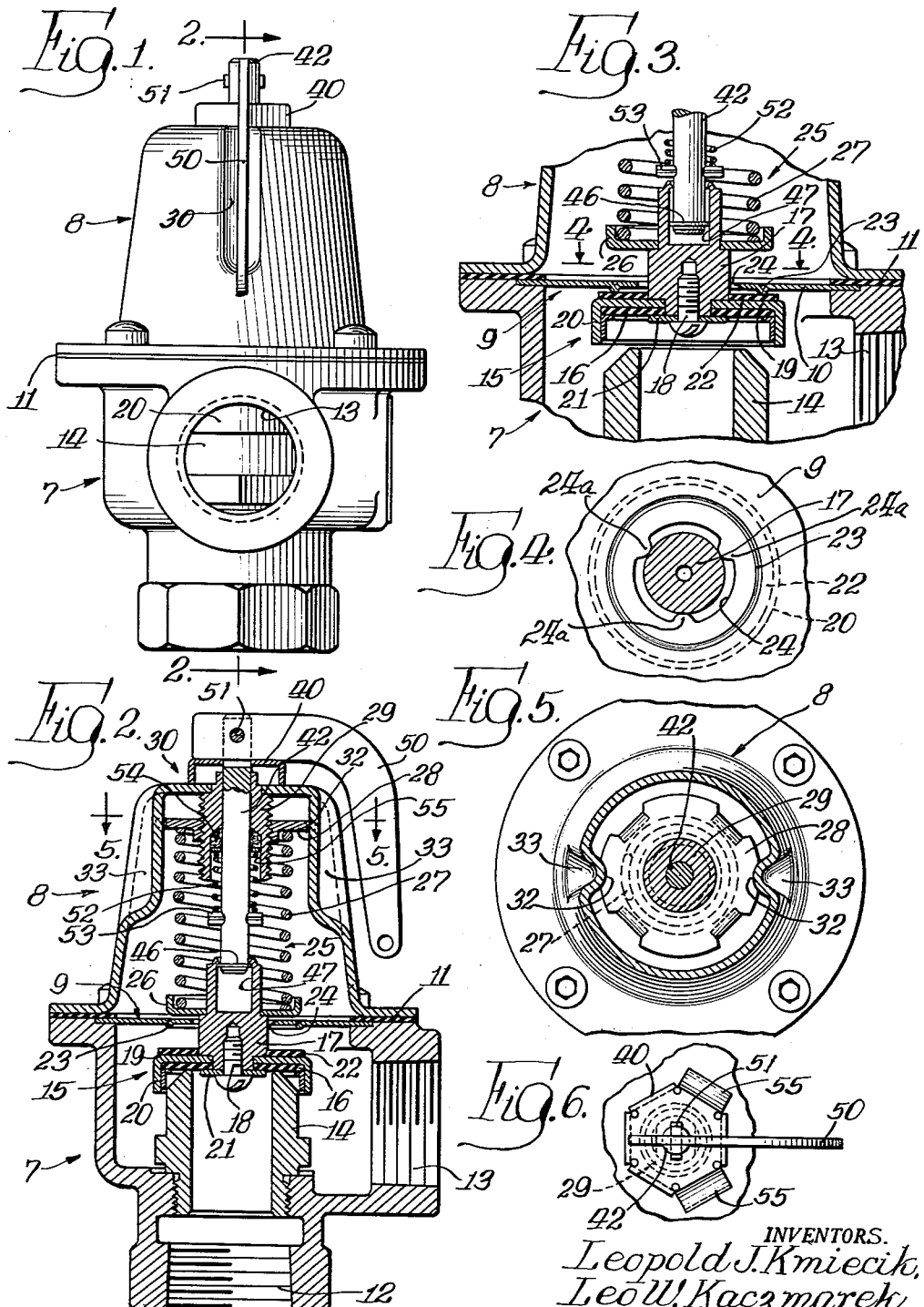

3,123,092
PRESSURE RELIEF VALVE
Leopold J. Kmiecik, Lincolnwood, and Leo W. Kaczmarek, Chicago, Ill., assignors to McDonnell & Miller, Inc., Chicago, Ill., a corporation of Delaware
Filed May 5, 1960, Ser. No. 27,130
4 Claims. (Cl. 137—469)

Our present invention relates to improvements in pressure relief valves.

In conventional pressure relief valves there is usually provided a valve member seated by a biasing spring against a valve seat arranged between an inlet and an outlet of the valve housing. The valve member is subjected to pressure of fluid at the inlet of the valve housing, and when the fluid pressure at the inlet exceeds a predetermined maximum sufficient to overcome the biasing force of the spring seating the valve member, the valve member is raised from the valve seat to connect the inlet with the outlet of the valve housing and relieve the pressure at the inlet. In such valve constructions it is also known to provide a flexible diaphragm extending across the valve housing and above the valve member and against which the valve member may, under certain conditions, be positioned so as to prevent back pressure in the valve housing from acting on the valve in a direction to seat the same on the valve seat. In the adaptation and use of pressure relief valves in boiler control systems, and elsewhere, no particular difficulty exists if the liquid under pressure at the inlet of the valve is at a temperature at which, when relieved by the valve, does not convert to steam. In such instances the valve member may open only a nominal extent in regard to the valve seat to relieve the pressure condition at the valve inlet. However, should the temperature of the liquid at the inlet be such that upon opening of the valve the liquid converts to steam, the valve member, especially if it incorporates a huddling member, will snap to full open position. In such instances the valve member is positioned against the flexible diaphragm so that back pressure in the valve housing is not effective to tend to seat the valve member or cause it to flutter.

The above known form of valve constructions have several disadvantages. For example, the aforementioned diaphragms thereof are subject to fracture upon repeated flexing resulting in the undesirable escaping of steam from the valve housing above the diaphragm, and further disrupting satisfactory operation of the valve.

It is an object of our invention to provide a pressure relief valve which avoids the above and other disadvantages of known valves by providing an arrangement in which a rigid plate member is provided and against which the valve member, when fully opened, is adapted to engage so as to prevent back pressure in the valve housing from tending to seat the valve member on the valve seat between the inlet and outlet of the valve, or to cause the valve member to flutter.

In order to achieve the aforementioned object, we propose to provide a pressure relief valve comprising a valve housing having an inlet and an outlet with a main valve seat therebetween, a spring housing mounted on the valve housing, a valve member for the main valve seat in the valve housing having a stem extension projecting into the spring housing, spring means in the spring housing for urging the valve member in a direction to seat the same on the main valve seat, rigid plate member for separating the valve housing and spring housing and through which the stem extension of the valve member projects, and in which arrangement, upon lifting of the valve member from the main valve seat by fluid above predetermined pressure and temperature at the inlet, the valve member is disposed to a position against the rigid plate member to close the opening therein through which the valve extension projects and to prevent back pressure in the valve housing from acting on the valve member. Preferably, the rigid plate member is provided with a plate valve seat about the opening therein for the valve stem, and the valve member includes a second valve for seating on the plate valve seat in the fully opened position of the valve member with respect to the main valve so that back pressure in the valve housing is prevented from acting upon the valve member and the latter is subject to seating on the main valve seat only by the biasing spring.

A preferred feature of our invention is to provide a construction as above noted in which the rigid plate member has guiding means for engagement with the stem extension of the valve member so as to maintain the valve member in alignment with the main and plate valve seats.

A further preferred feature is in our arrangement of the plate valve seat about the opening in the plate member for the stem extension for engagement by the valve member to protect and shield the guiding means of the plate member.

In valves of the class above indicated, adjustment means is usually provided for adjusting the force of the valve biasing spring means for seating the valve member on the main valve seat so that the valve may be regulated to open at a predetermined pressure. The adjusting means is normally readily accessible externally of the device and usually it may be easily actuated to alter the pressure at the inlet for opening the valve. In most instances it is undesirable that the adjusting means be tampered with, and it is preferable that the valve be set at the factory at the pressure at which it is to open.

Accordingly, it is a further object of our invention to provide adjustment means for adjusting the biasing force of the spring means for seating the valve member on the main valve seat between the inlet and outlet of the valve housing, and means for enclosing the adjustment means to prevent tampering with it.

To achieve the last noted object, we propose to dispose valve biasing spring means between the valve member and an axially spaced abutment plate mounted on a threaded adjustment member projecting outwardly through the spring housing. The outer projecting end of the threaded adjustment member extends through the spring housing and into a cap housing mounted on the spring housing. The cap housing preferably comprises one or more access openings which, when the cap is mounted on the spring housing, permit access to the aforementioned threaded adjustment member so that it may be rotated to move the abutment plate toward or away from the valve member and thus adjust the force of the valve biasing spring means to set the valve to open above a predetermined pressure. After the valve biasing spring means has been appropriately adjusted integral flap means of the cap housing are disposed to a position closing the access openings in the cap housing so that access cannot be had to the threaded adjustment member and thus prevent changing of the pressure at which the valve has been set to open. It is preferable that the cap housing be made of metal so that upon bending of the flap portions to closed position they cannot be easily or readily dislocated.

The valve of our invention further comprises means for manually raising the valve member from the main valve seat including a rod having lost motion connection with the stem extension of the valve member, and which extends through the threaded adjustment member and the cap housing. The outer projecting end of the rod member has a handle pivotally connected thereto and movement of the handle effects movement of the rod member to raise the valve member from the main valve seat. A further feature of our invention resides in providing for holding of the aforementioned handle in engagement with the cap housing by means of handle biasing spring means arranged between a cross pin on the rod member and packing means in the threaded adjustment member. The spring last mentioned additionally serves to maintain the packing in the threaded adjustment member under compression and in tight engagement with the periphery of rod member passing therethrough so that in the event steam should enter the spring housing the compressed packing prevents its escape along the rod member from the spring housing.

The above and other objects and features of our invention will appear from the following detailed description of a preferred embodiment of our invention.

Now in order to acquaint those skilled in the art with the manner of constructing and using a pressure relief valve in accordance with the principles of our present invention, we shall describe in connection with the accompanying drawings a preferred embodiment of our invention.

In the drawings:

FIGURE 1 is an end elevational view of a pressure relief valve constructed in accordance with the principles of our invention;

FIGURE 2 is a vertical sectional view, with certain parts being shown in elevation, of the valve of FIGURE 1 in closed position taken substantially along the line 2—2 of FIGURE 1, looking in the direction indicated by the arrows;

FIGURE 3 is an enlarged vertical sectional view of a portion of the valve construction shown in FIGURE 2, but with the valve member in fully opened position, and illustrating more particularly the arrangement of the parts adjacent the juncture of the valve and spring housings;

FIGURE 4 is a detail horizontal sectional view taken substantially along the line 4—4 on FIGURE 3 looking in a direction indicated by the arrows;

FIGURE 5 is a detail horizontal sectional view taken substantially along the line 5—5 of FIGURE 2 looking in a direction indicated by the arrows;

FIGURE 6 is a detail view of an enclosing cap member at the upper end of the spring housing provided for adjustment of the spring means for biasing the valve to its normally closed position.

Referring now to the drawing, we have shown a pressure relief valve, constructed in accordance with the principles of our invention, which comprises a cup-shaped valve housing, indicated generally at 7, and a cup-shaped spring housing, indicated generally at 8, which are mounted with their open ends in juxtaposition of each other. The housings 7 and 8 between their open ends receive and support a transversely extending plate member indicated generally at 9, which separates the valve housing 7 and spring housing 8 from each other. The plate member 9 is preferably fabricated of rigid material, for example of hard brass and is arranged with its peripheral portion disposed in a suitably conformed recess in the open end of valve housing. An annular gasket 11 is arranged between the annular flanges at the open ends of housings 7 and 8, and a plurality of bolts extend through the annular portions to provide a fluid tight connection of plate 9 about its periphery in the valve.

The valve housing 7 includes conventional tapped inlet and outlet openings 12 and 13, respectively. A main valve seat member 14 is threaded in the valve housing 7 at the inner end of the inlet opening 12. A valve member, designated generally by the reference numeral 15, is located within the valve housing 7 and includes a first lower main valve 16 for seating engagement with the main valve seat of the valve seat member 14 for preventing flow of fluid through the valve housing from the inlet 12 through the valve housing and out the outlet 13. The main valve 16, may be formed of any suitable material such as silicone rubber, and as shown is mounted to stem member 17 by a screw 18 between huddling ring 19 having a depending annular flange 20 and a washer 21. The stem member 17 also provides for the support of a second or plate valve 22, also preferably of silicone rubber, which is adapted to have seating engagement with a plate valve seat 23 formed as by stamping a ring like portion in the plate member in a direction to extend toward the second or plate valve 22 of valve member 15. The valve stem 17 projects through an opening 24 formed centrally of the plate member 9 and within the annular valve seat 23. Upon reference now to FIGURE 4 it will be seen that the plate member is formed with valve stem guide means comprising a plurality of projections 24a, three in the form of the plate illustrated, which projects inwardly of opening 24 for guiding engagement with the outer surface of valve stem 17.

Valve biasing spring means, indicated generally at 25, comprises a spring receiving cup member 26, seated on an annular shoulder intermediate the ends of stem member 17, in which one end of a valve biasing spring 27 in seated. The opposite end of spring 27 bears against an adjustable abutment plate member 28 threadedly mounted on rotatable threaded adjustment member 29 of spring adjustment means indicated generally at 30. The abutment plate 28, as best seen in FIGURE 5, is provided with diametrically opposed radially inwardly extending notches 32 which have guiding engagement with longitudinally inwardly extending ribs 33 of the spring housing 8 to prevent turning of the abutment plate member 28 upon its axial movement toward and away from the spring receiving cup member 26 upon turning movement of the threaded adjustment member 29.

A cap housing 40 is disposed at the upper end of the spring housing 8 to enclose the outer external end of threaded adjustment member 29. It will further be observed that a valve rod 42 extends from valve stem 17 through adjustment member 29 and outwardly of the spring housing 8 and cap housing 40. The lower end of valve stem 42 has lost motion connection with valve stem 17 afforded by a lock ring 46 at the lower end of rod 42 to permit relative inward axial movement of the same into the bore 47 at the upper end of stem member 17. Upon outward axial movement of rod 42 from the position shown in FIGURE 2, the ring 46 engages the peened or turned over end annular flange at the upper end of bore 47 in the valve stem 17 so as to lift the valve 15 and unseat the first or main valve 16 from the seat of the valve seat member 14. A manual try-out handle 50 has pivotal connection at 51 with the outer end of he rod 42 so that upon movement of the handle in a counterclockwise direction, as viewed in FIGURE 2, the valve member 15 may be manually raised to dispose the first or main valve 16 in unseated relation to the valve seat of member 14. The aforementioned cap housing 40 is retained in assembled position by means of the handle 50 and further serves as a reaction or fulcrum point for manually actuating the handle 50.

In order to prevent handle 50 from rattling and maintain its end adjacent cap housing 40 in snug engagement therewith, we provide a coil compression handle spring 52 surrounding rod 42 and arranged between cross pin 53 extending transversely through rod 42 and packing 54 at the upper end of a bore 55 extending upwardly into adjustment screw 29. The spring 52 in addition to holding handle 50 against movement, maintains the packing 54 under compression and in tight sealing engagement with the outer surface of rod 42. The seal afforded by packing 54 serves to prevent the escape of fluid such as steam, should the latter for some reason enter the spring housing 8.

In the construction thus far described, it will be observed that the compressive force of valve biasing spring 27 may be adjusted to provide for maintaining the first or main valve 16 seated on the valve seat member 14 at fluid pressures at the inlet of the valve below a predetermined maximum. If pressure at the inlet exceeds the predetermined maximum, the valve member 15 is raised to unseat main valve 16 from valve seat member 14. Depending on the pressure and temperature of the liquid at the inlet, the valve may partially or fully open. Should the pressure be only nominal over that for which spring 27 is set, the main valve 16 may only crack open slightly to relieve the pressure. Should, however, the pressure and temperature condition at the inlet be such that upon unseating of main valve 16 the liquid converts to steam, huddling ring 16 upon exposure to the steam effects rapid movement of valve 15 to seat plate valve 22 against plate valve seat 23 of the plate member 9. When the valve is actuated, as last mentioned, the inlet and outlet of the valve are connected through the valve housing 7 and steam in the latter is prevented from entering the spring housing 8 by engagement of the aforementioned plate valve 22 with plate valve seat 23 to thus prevent steam from entering the spring housing 8. In this manner the guide means 24a for the valve stem 17 and parts within the spring housing are protected from damage by the steam. Also, with the valve member 15 in its position last noted, back pressure of fluid under pressure within the valve housing 7 is prevented from acting upon the area of the plate valve 22, and thus such back pressure is prevented from tending to close or cause fluttering of the valve 15. By reason of the arrangement noted, the first or main valve 16 is seated on the valve seat member 14 by spring 27 when the pressure at the inlet 12 drops below the predetermined pressure for which the spring biasing means 25 has been set.

As before indicated, it is desirable that valves of the character noted be factory set to open above a predetermined pressure and that tampering with the adjustment means after the valves leave the factory should be avoided. To this end, we propose to provide the cap housing 49 with bendable flap means, such as foldable walls as indicated at 55 which, upon initial assembly of the valve are disposed to extend substantially horizontally, as shown in FIGURE 6, permitting access through the openings in the vertical walls of the cap housing to the threaded adjustment member 29 to effect its rotation by a spanner wrench or the like to effect the desired adjustment of valve biasing spring 27. After the valve has been set to operate at a desired predetermined pressure, the flap portions or walls 55 are bent to positions to close the wall openings in the housing and thus prevent ready or convenient access to the adjustment threaded member 29 of the adjustment means.

While we have shown what we consider to be a preferred embodiment of our invention, it will be understood that various modifications and rearrangements may be made therein without departing from the spirit and scope of our invention.

We claim:

1. A pressure relief valve for boilers or the like comprising a valve housing having a liquid inlet, an outlet, and a main valve seat between said liquid inlet and said outlet, a spring housing mounted on said valve housing, rigid plate means extending between and separating said valve and spring housings from each other, an opening in said plate means, a plate valve seat surrounding said opening, a main valve assembly in said housing comprising a stem member, a huddling member mounted on said stem member and having a closed end and an open end surrounded by an annular flange depending from said closed end, a main valve within said huddling member for seating on said main valve seat, and a plate valve at said closed end of said huddling member for seating on said plate valve seat, said plate valve and said plate valve seat being substantially of the same diameter as the closed end of said huddling member, said valve housing upon connection of said inlet and said outlet through said main valve seat at predetermined pressure and temperature conditions of liquid at said inlet for converting the liquid to a gaseous medium providing for expansion of the gaseous medium to effect a back pressure condition in said valve housing, valve biasing spring means engaging said valve assembly for seating said main valve on said main valve seat against liquid below a predetermined pressure at said inlet, said huddling member under said predetermined temperature and pressure conditions converting liquid in said valve housing to a gaseous medium effecting snap movement of said valve assembly to seat said plate valve on said plate valve seat and close said opening in said plate means, and said plate valve in its seated position on said plate valve seat preventing back pressure of the gaseous medium in said valve housing from acting on said closed end of said huddling member of said valve assembly tending to move said valve assembly in a direction to seat said main valve on said main valve seat.

2. A pressure relief valve for boilers or the like comprising a valve housing having a liquid inlet, an outlet, and a main valve seat between said liquid inlet and said outlet, a spring housing mounted on said valve housing, rigid plate means extending between and separating said valve and spring housings from each other, an opening in said plate means, said plate means having a plurality of projections disposed in circumferentially spaced relation of and extending inwardly into the opening therein, a plate valve seat surrounding said opening, a valve assembly in said housing comprising a stem member extending through said opening in said plate means, a huddling member mounted on said stem member and having a closed end and an opened end surrounded by an annular flange depending from said closed end, a main valve for seating on said main valve seat, and a plate valve at said closed end of said huddling member for seating on said plate valve seat, said plate valve and said plate valve seat being substantially of the same diameter as the closed end of said huddling member, the outer ends of said projections of said plate means having guiding engagement with portions of the outer surface of said stem, said valve housing upon connection of said inlet and said outlet through said main valve seat at predetermined pressure and temperature conditions of liquid at said inlet for converting the liquid to a gaseous medium providing for expansion of the gaseous medium to effect a back pressure condition in said valve housing, valve biasing spring means engaging said valve assembly for seating said main valve on said main valve seat against liquid below a predetermined pressure at said inlet, said huddling member under said predetermined temperature and pressure conditions converting liquid in said valve housing to a gaseous medium effecting snap movement of said valve assembly to seat said plate valve on said plate valve seat and close said opening in said plate means, and said plate valve in its seated position on said plate valve seat preventing back pressure of the gaseous medium in said valve housing from acting on said closed end of said huddling member of said valve assembly tending to move said valve assembly in a direction to seat said main valve on said main valve seat.

3. A pressure relief valve for boilers or the like comprising a lower valve housing having a liquid inlet, an outlet, and a main valve seat between said liquid inlet and said outlet, an upper spring housing mounted on and above said valve housing, rigid plate means extending transversely between and separating the valve and spring housings from each other, and an opening in said plate means, said plate means having a plurality of projections disposed in circumferentially spaced relation of and extending inwardly into the opening therein, a plate valve seat surrounding said opening, a valve assembly in said valve housing comprising a stem member extending through said opening in said plate means and into said spring housing, a huddling member mounted on said stem member and having a closed end and an opened end surrounded by an annular flange depending from said closed end, a main valve for seating on said main valve seat, and a plate valve for seating on said plate valve seat, the other ends of said projections of said plate means having guiding engagement with portions of the outer surface of said valve stem, valve biasing spring means comprising a lower spring supporting member seated on said valve stem above said plate means, a rotatable adjusting member extending inwardly of said spring housing from the upper end thereof, an abutment member having threaded engagement with said adjusting member, rib means extending inwardly of said spring housing engaging said abutment member to prevent rotation thereof so that said abutment member is movable toward and away from said lower spring supporting member by rotation of said adjusting member, a coil spring extending between said abutment member and said lower spring supporting member for biasing said valve assembly to seat said main valve on said main valve seat against liquid below a predetermined pressure at said inlet, said valve housing upon connection of said inlet and said outlet through said main valve seat at predetermined pressure and temperature conditions of liquid at said inlet for converting the liquid to a gaseous medium providing for expansion of the gaseous medium to effect a back pressure condition in said valve housing, said huddling member under said predetermined temperature and pressure conditions converting liquid in said valve housing to a gaseous medium effecting snap movement of said valve assembly to seat said plate valve on said plate valve seat and close said opening in said plate means, and said plate valve in its seated position on said plate valve seat preventing back pressure of gaseous medium in said valve housing from acting on said closed end of said huddling member of said valve assembly tending to move said valve assembly in a direction to seat said main valve on said main valve seat.

4. A pressure relief valve for boilers or the like comprising a lower valve housing having a liquid inlet, an outlet, and a main valve seat between said liquid inlet and said outlet, an upper spring housing mounted on and above said valve housing, rigid plate means extending transversely between and separating the valve and spring housings from each other, an opening in said plate means, said plate means have a plurality of projections extending inwardly into the opening therein, a plate valve seat surrounding said opening, a valve member in said valve housing comprising a huddling member, a main valve for seating on said main valve seat, and a plate valve for seating on said plate valve seat, said valve member having a stem projecting upwardly through said opening in said plate means and into said spring housing, said projections of said plate means having guiding engagement with the outer surface of said stem, valve biasing spring means comprising a lower spring supporting member seated on said valve stem above said plate means, a rotatable adjusting member extending inwardly of said spring housing from the upper end thereof, an abutment member having threaded engagement with said adjusting member, rib means extending inwardly of said spring housing engaging said abutment member to prevent rotation thereof so that said abutment member is movable toward and away from said lower spring supporting member by rotation of said adjusting member, a coil spring extending between said abutment member and said lower spring supporting member for biasing said valve member to seat said main valve on said main valve seat against liquid below a predetermined pressure at said inlet, a valve rod having lost motion connection with said valve stem and extending through said adjusting member outwardly through the upper end of said spring housing, and packing means between said adjusting member and said valve rod defining a fluid tight seal therebetween, said valve housing upon connection of said inlet and said outlet through said main valve seat at predetermined pressure and temperature conditions of liquid at said inlet for converting the liquid to a gaseous medium providing for expansion of the gaseous medium to effect a back pressure condition in said valve housing, said huddling member under said predetermined temperature and pressure conditions converting liquid in said valve housing to a gaseous medium effecting snap movement of said valve member to seat said plate valve on said plate valve seat and close said opening in said plate means, and said valve member in the seated position of said plate valve on said plate valve seat preventing back pressure of gaseous medium in said valve housing from acting on said valve member tending to move said valve member in a direction to seat said main valve on said main valve seat.

References Cited in the file of this patent

UNITED STATES PATENTS

| 2,015,930 | Groble | Oct. 1, 1935 |
|---|---|---|
| 2,160,536 | Buning | May 30, 1939 |
| 2,310,558 | Teeters | Feb. 9, 1943 |
| 2,380,459 | Noesemann | July 31, 1945 |
| 2,517,858 | Farris | Aug. 8, 1950 |
| 2,642,255 | Lindgren | June 16, 1953 |
| 2,672,882 | Bergquist | Mar. 23, 1954 |
| 2,695,032 | Kmiecik | Nov. 23, 1954 |
| 2,817,356 | Glass | Dec. 24, 1957 |
| 2,922,436 | Brash | Jan. 26, 1960 |

FOREIGN PATENTS

| 504,857 | Great Britain | May 2, 1939 |